US011129342B2

(12) United States Patent
Nydegger

(10) Patent No.: US 11,129,342 B2
(45) Date of Patent: Sep. 28, 2021

(54) LIGHT-DEPRIVATION SYSTEM

(71) Applicant: Trent R. Nydegger, Highland, UT (US)

(72) Inventor: Trent R. Nydegger, Highland, UT (US)

( * ) Notice: Subject to any disclaimer, the term of this patent is extended or adjusted under 35 U.S.C. 154(b) by 132 days.

(21) Appl. No.: 16/275,438

(22) Filed: Feb. 14, 2019

(65) Prior Publication Data

US 2020/0260660 A1    Aug. 20, 2020

(51) Int. Cl.
*A01G 13/02* (2006.01)
*A01G 9/22* (2006.01)

(52) U.S. Cl.
CPC ......... *A01G 13/0206* (2013.01); *A01G 9/227* (2013.01)

(58) Field of Classification Search
CPC .... A01G 13/0206; A01G 9/227; E04H 15/14; E04H 15/16; E04H 15/24; E04H 15/26
USPC ...................... 47/17; 135/99, 100, 91, 93, 94
See application file for complete search history.

(56) References Cited

U.S. PATENT DOCUMENTS

| | | | | |
|---|---|---|---|---|
| 1,106,624 A * | 8/1914 | Cadwallader | ........... | E04F 10/02 47/22.1 |
| 1,198,178 A * | 9/1916 | Bauer | ................... | A01G 13/043 47/29.6 |
| 1,711,843 A * | 5/1929 | Hammond | ........... | A01G 13/043 47/23.2 |
| 4,064,648 A * | 12/1977 | Cary | ....................... | A01G 9/227 47/17 |
| 4,067,347 A * | 1/1978 | Lipinski | ................... | E04H 15/48 126/624 |
| 4,387,533 A * | 6/1983 | Green | ....................... | A01G 9/22 47/17 |
| 4,706,420 A * | 11/1987 | Winkler | ................... | A01G 9/22 52/66 |
| 4,753,054 A * | 6/1988 | Butler | ....................... | A01G 9/14 52/18 |
| 5,311,699 A * | 5/1994 | Huffman | ................... | A01G 9/22 47/22.1 |
| 5,802,762 A * | 9/1998 | Stonecypher | ............ | A01G 9/16 47/17 |
| 5,829,200 A * | 11/1998 | Jones | ................... | A62C 3/0257 52/3 |
| 6,260,308 B1 * | 7/2001 | Looney | ................... | A01G 9/227 52/63 |
| 7,497,048 B2 * | 3/2009 | Bakowski | ............ | A01G 13/043 135/100 |
| 9,295,202 B2 * | 3/2016 | Wallace | ................... | A01G 9/14 |
| 9,642,315 B2 * | 5/2017 | Lloyd | ................... | A01G 9/227 |
| 9,756,795 B2 * | 9/2017 | Cappi | ................ | A01G 13/0206 |
| 9,885,182 B1 * | 2/2018 | Harkins | ................... | E04D 5/148 |
| 2003/0070353 A1 * | 4/2003 | Mercurio | ............... | A01G 9/242 47/17 |

(Continued)

*Primary Examiner* — Magdalena Topolski
*Assistant Examiner* — Kevin M Dennis
(74) *Attorney, Agent, or Firm* — Workman Nydegger

(57) ABSTRACT

A light-deprivation system includes shades having a fixed end that form a perimeter that defines a growing environment, cables attached to a free end of each shade, a cable guide located near a pinnacle of the light-deprivation system, and a winch to draw the shades. The cables run from the free end of each shade, through the cable guide, to the winch. Operation of the winch draws the shades simultaneously to block substantially all light from sources external to the growing environment from reaching the growing environment.

16 Claims, 3 Drawing Sheets

(56) References Cited

U.S. PATENT DOCUMENTS

| | | |
|---|---|---|
| 2004/0134122 A1* | 7/2004 | Van Bergen-Henegouwen ........... A01G 13/0206 47/22.1 |
| 2012/0067388 A1* | 3/2012 | Zummach ............... E04H 15/58 135/96 |
| 2014/0157662 A1* | 6/2014 | Wallace ................. A01G 9/241 47/17 |
| 2016/0262318 A1* | 9/2016 | Lloyd ................. E04F 10/0614 |
| 2019/0063093 A1* | 2/2019 | Coenraets ................ B60J 7/085 |

* cited by examiner

LIGHT-DEPRIVATION SYSTEM

BACKGROUND OF THE DISCLOSURE

Plants need various periods of exposure to light and periods of darkness when the plants are deprived of light to maximize their growth potential and yield. Various greenhouses have been developed with shades to control the periods of time to which plants are provided with and deprived of light. Such greenhouses are commonly referred to as light-deprivation greenhouses.

Examples of various conventional light-deprivation greenhouses are disclosed in U.S. Patent Application Publication No. 2014/0157662 to Wallace et al., U.S. Pat. No. 4,064,648 to Cary, U.S. Patent Application Publication No. 2004/0134122 to Van Bergen-Henegouwen et al., and U.S. Pat. No. 5,802,762 to Stonecypher.

However, these and other conventional light-deprivation greenhouses employ complex systems, complex motors, and numerous components, all of which contribute to make such light-deprivation greenhouses expensive to manufacture and assemble. The light deprivation systems in these greenhouses are an integral part of the greenhouse. For example, the light deprivation shades use the framework of the greenhouse to support the light deprivation shades. Additionally, the complex machinery and components of such light-deprivation greenhouses are prone to wear, malfunction, and failure, making them difficult and expensive to maintain and repair.

Such conventional light-deprivation greenhouses also typically attach the shade outside the frame of the greenhouse, thereby using the walls and roof of the greenhouse to support the shades. This placement exposes the shades to the elements, thereby accelerating the rate at which the shades and related componentry wear down and malfunction.

A light-deprivation system that is simple to manufacture and assemble, has relatively few moving parts, and can located inside the greenhouse walls or in an open field without a greenhouse is therefore desirable.

BRIEF SUMMARY OF THE DISCLOSURE

This summary is provided to introduce a selection of concepts that are further described below in the detailed description. This summary is not intended to identify specific features of the claimed subject matter, nor is it intended to be used as an aid in limiting the scope of the claimed subject matter.

In an embodiment, a light-deprivation system is in the general shape of a pyramid. Four roller shades form a perimeter around a growing area. A vertical pole is located in the center of the growing area, extending to a pinnacle of the light-deprivation system. The free end of each roller shade is attached to the first end of a line. Each line runs from the free end of the respective shade to the top of the pole. The second end of each line is attached to a reel located on the pole. When activated, the reel reels in each line to draw each shade. The reel also has a release. Engaging the release of the reel allows the roller shades to retract and roll-up into a storage position at the perimeter of the growing area, thereby opening each shade to expose the growing area to natural light.

In another embodiment, the light-deprivation system is located inside a greenhouse, the green house being in the shape of a pyramid. Each of the four walls of the greenhouse has a roller shade attached at the inside base thereof. The fabric of each shade is in the general shape of its corresponding wall when drawn.

A vertical pole is located in the center of the greenhouse, extending substantially to the pinnacle of the light-deprivation system. The free end of each roller shade is attached to the first end a line. Each line runs from the free end of the respective shade along the respective wall to the top of the pole. The second end of each line is attached to a reel. When activated, the reel reels in each line to draw each shade. The reel also has a release. Engaging the release of the reel allows the roller shades to retract and roll-up into a storage position at the base of each wall, thereby opening each shade.

In another embodiment, a track is located along the joint of each wall and runs substantially along the length thereof. The side edges of each shade engage with the track when the shade is drawn. The tracks support the edges of the shades to help prevent the edges of the shades from drooping when the shades are drawn to prevent light from entering the greenhouse. The tracks may also engage the sides of the shades in a manner that helps to prevent light from entering the greenhouse at the seams between shades.

Additional features of embodiments of the disclosure will be set forth in the description which follows. The features of such embodiments may be realized by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Some of the drawings may be schematic or exaggerated representations of concepts, and thus not drawn to scale. Understanding that the drawings depict some example embodiments, the embodiments will be described and explained with additional specificity and detail through the use of the accompanying drawings in which.

DETAILED DESCRIPTION

Several embodiments of the present disclosure will be described below.

In an effort to provide a concise description of these embodiments, some features of an actual embodiment may be described in the specification. It should be appreciated that in practice, as in any engineering or design project, numerous embodiment-specific decisions will be necessary to achieve the developers' specific goals, such as compliance with system-related and business-related constraints, which may vary from one embodiment to another. It should further be appreciated that such a development effort might be complex and time consuming, but would nevertheless be a routine undertaking of design, fabrication, and manufacture for those of ordinary skill having the benefit of this disclosure.

Figure 1:
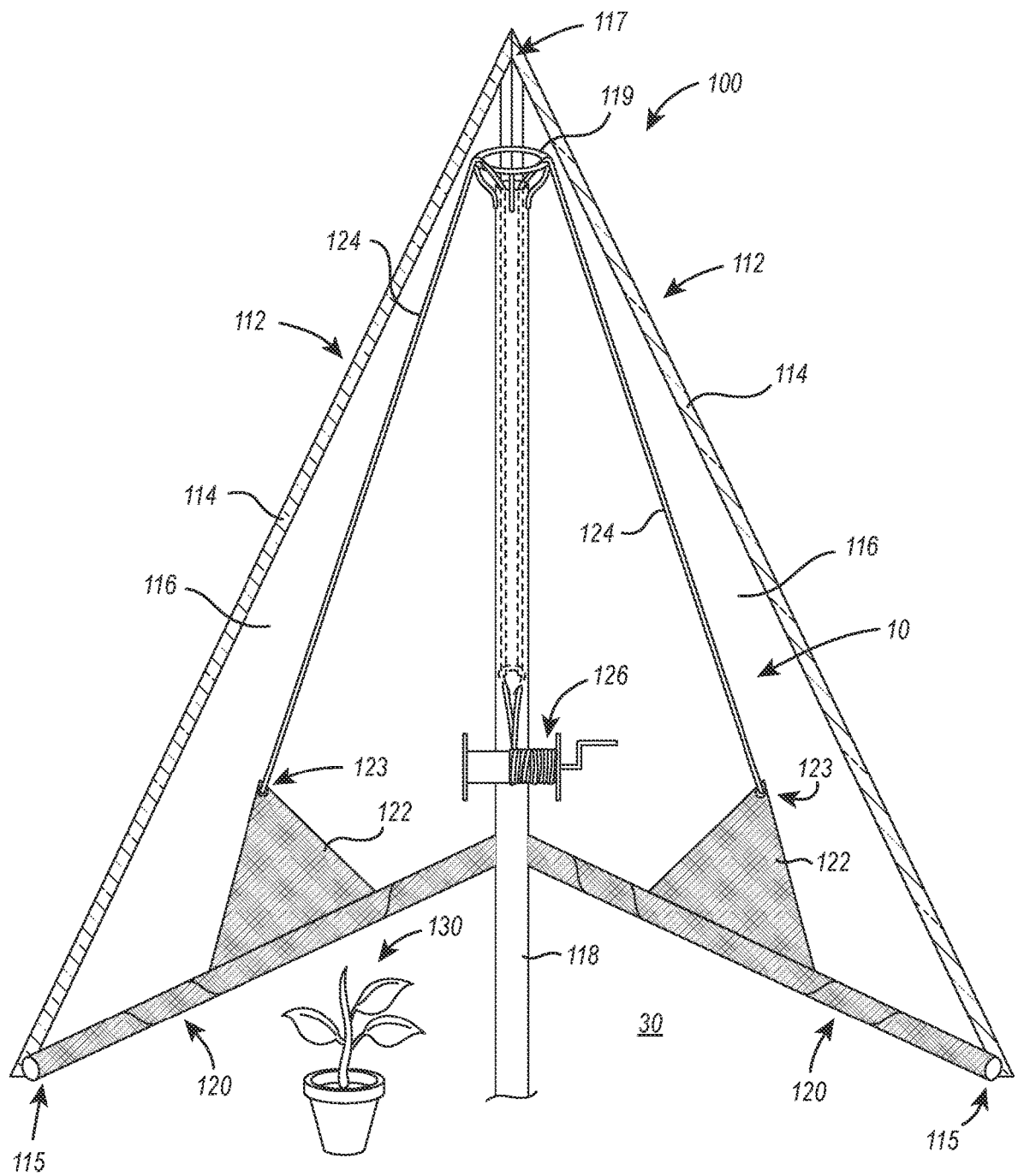
FIG. 1 is a cross-sectional view of an embodiment of a light-deprivation system in a greenhouse according to the present disclosure.
Figure 2:
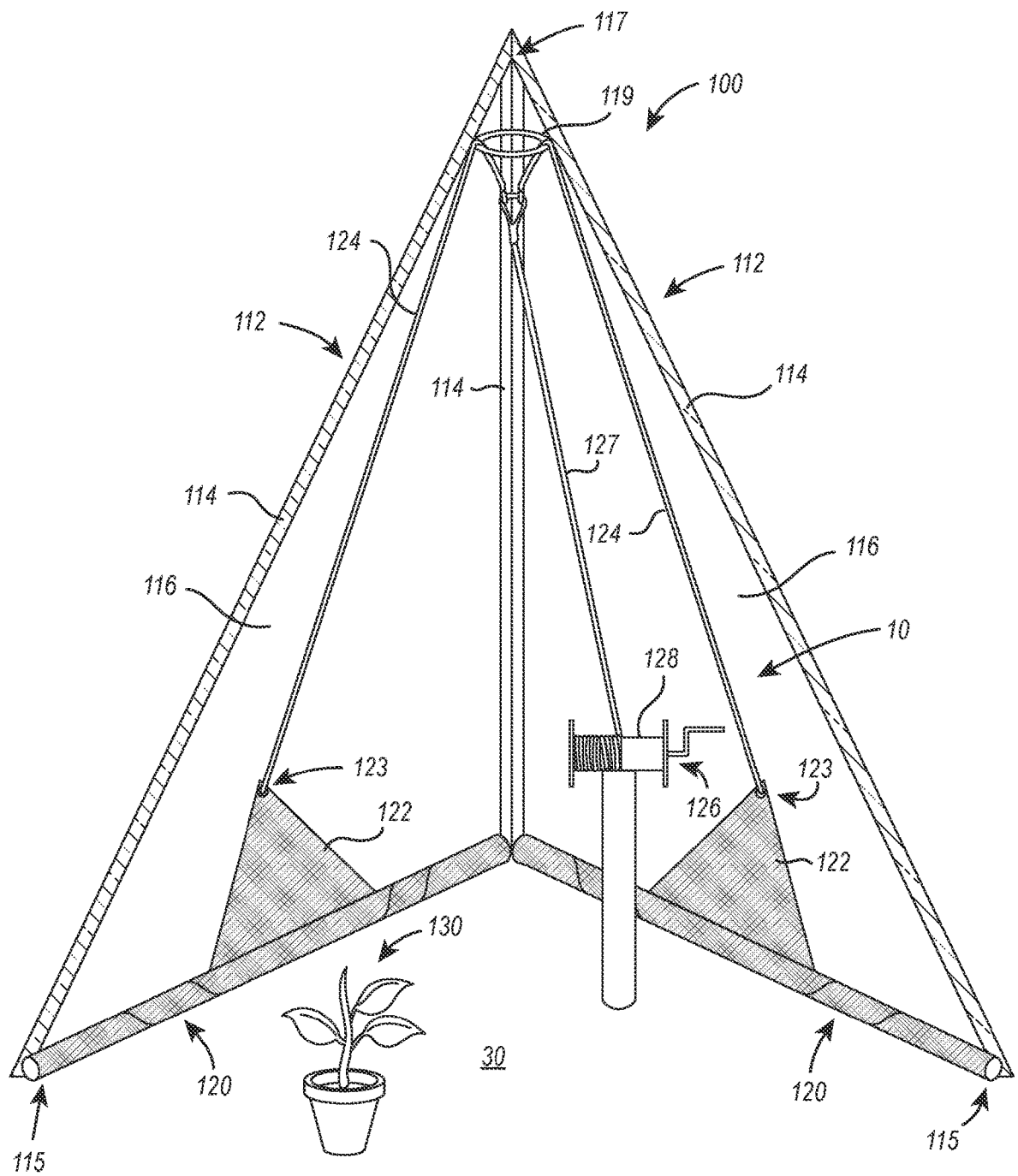
FIG. 2 is a cross-sectional view of another embodiment of a light-deprivation system in a greenhouse according to the present disclosure.

FIGS. 1 and 2 depict a cross-section of two embodiments of a light-deprivation system installed in a greenhouse 100 according to the present disclosure. While this embodiment of a light-deprivation system is depicted inside the greenhouse 100, the light-deprivation system depicted in FIG. 1 is not attached to the greenhouse 100, and thus could be installed in an open field without a greenhouse.

The greenhouse 100 includes walls 112. Each wall 112 has a base end 115. Walls 112 have frames 114 and panels 116. Panels 116 allow daylight to pass through the walls 112 to provide light to plants 130. In one embodiment, the walls 112 form a pyramid having a square base (two walls 112 of which are shown in the cross-sectional views of FIGS. 1 and 2) with each wall 112 set at an angle of about 70° to the ground. However, those of skill understand that the shape of the base may be triangular, or another polygonal shape, and that the walls may be set at angles other than 70°.

In this disclosure a "pyramid" refers to any light-deprivation system or greenhouse in which the walls are substantially planar and extend substantially from the perimeter at the base to a pinnacle so as to avoid significant curvature in the walls and/or corners between the walls and a substantially horizontal ceiling. A "pyramid" as used in this disclosure does not include light-deprivation system or greenhouses with vertical walls that have a corner to transition to a ceiling, an example of which is shown in U.S. Pat. No. 4,064,648 to Cary, or with walls that are curved to form an arched ceiling, an example of which is shown in U.S. Patent Application Publication No. 2014/0157662 to Wallace et al. However, a "pyramid" as used in this disclosure is intended to include a pyramid as previously described that is set on top of vertical foundation walls.

A light-deprivation system 10 having shades 120 is located inside greenhouse 100. Shades 120 have a first fixed end located at or near the base end 115 of a corresponding wall 112 and are co-extensive with the length of the corresponding wall 112. The shades 120 form a perimeter that defines a growing environment 30 within the perimeter for growing plants 130. The first fixed end of shades 120 is considered to be "fixed" in that it does not travel across panel 116 when drawn to prevent light from entering the greenhouse; the first fixed end of shades 120 may or may not be attached to the base end 115 of the corresponding wall 112. Shades 120 have a material 122 that, when drawn, is substantially the shape of the corresponding wall 112 to which it is fixed. In one embodiment, shades 120 are retractable roller shades as are known in the art. To open conventional retractable roller shades, a user activates a spring or other mechanism that retracts the shade and rolls it up so as to allow light to enter the room. In another embodiment, shades 120 are retracted by the force of gravity and simply gather at or near the base end 115 of each wall 112. In yet another embodiment shades 120 gather into a container (not shown) located at or near the base 115 of each wall 112. One advantage of a pyramidal shape for the light-deprivation system is that there is no corner or curvature along shades that would require additional rigid support, thereby simplifying the manufacture, construction and installation of the shades 120. Additionally, the absence of corners and/or curvature between the walls and the ceiling allows the shades 120 to travel in a straight path, which further simplifies the overall light-deprivation system.

The material 122 may be a textile, fabric, plastic sheet, wood slats, or other material commonly known in the art for making shades. In one embodiment the material 122 is blackout material that precludes all light from passing through it. In another embodiment, material 122 blocks at least ninety percent of light from passing through the material. The material 122 can be breathable (allowing air to pass through the material), or non-breathable (preventing air from passing through the material). In one embodiment roller shades 120 are motorized to open and close the shade, as is known in the art. In another embodiment roller shades 120 are closed manually and opened by a spring mechanism, as is known in the art.

A second free end of material 122 of each shade 120 is attached to the first end 123 of a cable 124. Cables 124 run from the material 122 to a cable guide 119 located at or near the pinnacle 117 of light-deprivation system 10. In one embodiment cable guide 119 may be attached at or near the top of a vertical pole 118 (FIG. 1). In another embodiment cable guide 119 may be attached directly to one or more walls 112 to form the pinnacle 117 of light-deprivation system 10 (FIG. 2). In yet a further embodiment, each cable has its own corresponding cable guide. Cable guide 119 may be a ring, pulley eyelet, opening to the vertical pole 118, or any other structure configured to support cables 124 and/or redirect them to a winch 126.

Returning to FIG. 1, second ends of cables 124 are connected directly to winch 126. In another embodiment, second ends of cables 124 are connected to winch 126 via a second cable 127 (FIG. 2). In other words, the second ends of cables 124 may each be connected to a first end of second cable 127, and the second end of the second cable 127 is attached to the winch such that only second cable 127 is directly attached to and wound onto a spool 128 of winch 126. Winch 126 can be powered by a hand crank, electric, hydraulic, pneumatic, or internal combustion drives, as is known in the art. Winch 126 may also include a solenoid brake, mechanical brake, and/or a ratchet and pawl device to prevent the winch 126 from unwinding unless the brake is disengaged and/or the pawl is retracted.

Figure 3:
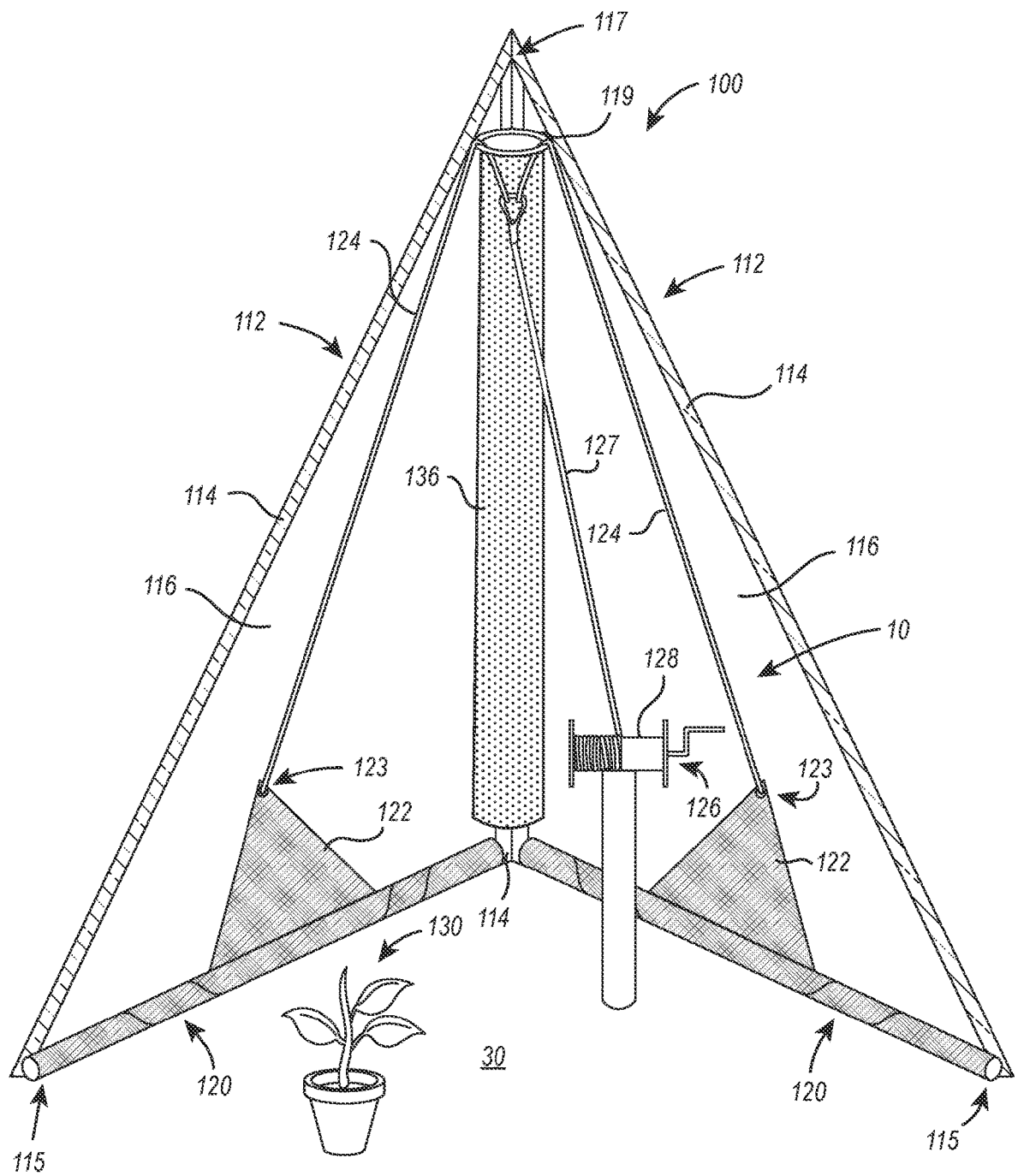
FIG. 3 is a cross-sectional view of another embodiment of a light-deprivation system in a greenhouse according to the present disclosure.

During operation, the winch 126 is activated to simultaneously draw shades 122. As depicted in FIGS. 1-3, when the winch 126 is activated the shades may be partially closed, or they may be completely closed to block all light as previously noted. In one embodiment activating winch 126 draws all shades 122 simultaneously. However, persons of skill in the art will recognize that multiple winches can be used to draw any number of shades independently or simultaneously depending on the particular configuration of the greenhouse, capacity of the winch, and force required to draw the shade(s). Persons of skill in the art will also recognize that additional cable guides may be positioned at various locations along the cables 124 and/or second cable 127 to limit sagging and/or lateral and vertical movement of the cables during operation of the shades. In one embodiment the edges of material 122 are reinforced such that when the shades 120 are drawn, cable 124 places tension on the edges of material 122 to reduce sagging in the edges of material 122. When the shades 120 are drawn, the shades 120 substantially darken the interior of greenhouse 100 by substantially preventing light passing through panels 116 from reaching the plants 130.

In another embodiment, shade guides 136 (FIG. 3) are located near the joints between each of walls 112. When shades 122 are drawn the edges of shades 122 are located between the shade guides 136 and the walls 112, thereby overlapping and interacting with the shade guides 136 to create a light seal that substantially prevents light from passing through the joints between shades. Shade guides 136 can be made of textile, fabric, plastic, wood, metal, or other material that substantially prevents light from passing through the material. In another embodiment shade guides 136 support the edges of material 122 to reduce sagging in shades 120.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The present disclosure may be embodied in other specific forms without departing from its spirit or characteristics. A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A light-deprivation system for controlling an amount of light that reaches a growing environment, the light-deprivation system comprising:
   a plurality of shades forming a perimeter at a base of a pyramid that defines the growing environment within the perimeter of the pyramid, the shades being positioned to block entry of substantially all light from entering the growing environment when the shades are drawn up to a pinnacle of the pyramid, each shade being configured to correspond to a side of the pyramid when the shades are drawn up to the pinnacle of the pyramid, and each shade comprising:
      a first end anchored at a base of the shade, the first end providing a fixed point of reference from which the shade is drawn; and
      a second end which is movable to permit the shade to be drawn up to said pinnacle of the pyramid;
   a winch;
   a plurality of cables, each cable comprising a first end attached to the second end of a corresponding shade and a second end; and
   wherein the second end of each cable is adapted to respond to a mechanism of the winch that, when activated, simultaneously draws each said second end of each cable toward the winch so that the corresponding first cable end attached to the second end of the corresponding shade in turn simultaneously draws the corresponding shade for each side of the pyramid from the base of the pyramid toward the pinnacle of the pyramid in order to either partially close each shade or to completely close each shade to prevent substantially all light from entering the growing environment through any portion of the plurality of shades that are drawn toward the pinnacle.

2. The light-deprivation system of claim 1 further comprising:
   a pole located essentially at a center of the growing environment and extending substantially to the pinnacle of the pyramid; and
   a cable guide attached to the pole at or near the pinnacle, and wherein the first end of each of the plurality of cables runs through the cable guide for attachment to the second, movable end of the corresponding shade.

3. The light-deprivation system of claim 2, wherein the second end of each cable is attached to the winch.

4. The light-deprivation system of claim 3, further comprising an intermediate cable, and wherein the second end of each cable is attached to one end of the intermediate cable, and an opposite end of the intermediate cable is attached to the winch, so that when the winch is activated the intermediate cable is wound up by the winch and in doing so, the intermediate cable causes each of the plurality of cables to draw the second, movable end of the corresponding shade up to the pinnacle of the pyramid.

5. A light-deprivation system for controlling light that reaches a growing environment, the light-deprivation system comprising:
   a plurality of triangular shades forming a perimeter at a base of a pyramid that defines the growing environment within the perimeter of the pyramid, the triangular shades being configured to block entry of substantially all light from entering the growing environment when the triangular shades are drawn up to a pinnacle of the pyramid, each triangular shade being configured to correspond to a side of the pyramid when the triangular shades are drawn up to the pinnacle of the pyramid, and each triangular shade comprising:
      a first end anchored at a base of the triangular shade, the first end providing a fixed point of reference from which the triangular shade is drawn; and
      a second end which is moveable to permit the triangular shade to be drawn up to said pinnacle of the pyramid;
   at least one winch;
   a plurality of cables, each cable comprising a first end attached to the second end of a corresponding triangular shade and a second end; and wherein the second end of each cable is adapted to respond to a mechanism of the at least one winch that, when activated, simultaneously draws said second end of each cable toward the at least one winch so that the corresponding first cable end attached to the second end of the corresponding triangular shade in turn simultaneously draws the corresponding triangular shade from the base of the pyramid toward the pinnacle of the pyramid in order to either partially close each shade or to completely close each shade to block substantially all light from entering the growing environment through any portion of the plurality of triangular shades that are drawn toward the pinnacle.

6. The light-deprivation system of claim 5, further comprising a cable guide located at or near the pinnacle, and wherein the first end of each of the plurality of cables runs through the cable guide for attachment to the second, movable end of the corresponding triangular shade.

7. The light-deprivation system of claim 6, further comprising:
 a pole located essentially at a center of the growing environment and extending substantially to the pinnacle; and
 wherein the cable guide is attached to the pole at or near a top of the pole located at or near the pinnacle of the pyramid.

8. The light-deprivation system of claim 6, wherein the second end of each of the plurality of cables is attached to an intermediate cable at one end of the intermediate cable, and an opposite end of the intermediate cable is attached to the at least one winch, so that when the mechanism of the at least one winch is activated the intermediate cable is wound up by the at least one winch and in doing so, the intermediate cable causes each of the plurality of cables to draw the corresponding triangular shade up to the pinnacle of the pyramid.

9. The light-deprivation system of claim 6, further comprising at least one shade guide located between each pair of the triangular shades.

10. The light-deprivation system of claim 6, wherein each triangular shade comprises a roller shade.

11. A light-deprivation system for controlling light that reaches a growing environment located in a greenhouse, the light-deprivation system comprising:
 a plurality of triangular shades forming a perimeter at a base of a pyramid that defines the growing environment within the perimeter of the pyramid, the triangular shades being configured to block entry of substantially all light from entering the growing environment when the triangular shades are drawn up to a pinnacle of the pyramid, each triangular shade being configured to correspond to a side of the pyramid when the shades are drawn up to the pinnacle of the pyramid, and each triangular shade comprising:
  a first end anchored at a base of the triangular shade, the first end providing a fixed point of reference from which the triangular shade is drawn; and
  a second end which is moveable to permit the triangular shade to be drawn up to said pinnacle of the pyramid;
 a winch within the growing environment of the pyramid;
 a cable guide configured to be attached to the greenhouse and that forms the pinnacle toward which the plurality of triangular shades move when drawn up to the pinnacle;
 a plurality of cables, each cable comprising a first end attached to the second end of a corresponding triangular shade and a second end; and
 wherein each cable passes through the cable guide at the pinnacle, with the second end of each cable adapted to respond to a mechanism of the winch which, when activated, winds up each of the plurality of cables when it is desired to simultaneously draw each of the corresponding plurality of triangular shades from the base of the pyramid toward the cable guide at the pinnacle in order to either partially close each shade or to completely close each shade to block substantially all light from entering the growing environment through any portion of the plurality of triangular shades that are drawn toward the pinnacle.

12. The light-deprivation system of claim 11, further comprising at least one shade guide located between each pair of the triangular shades.

13. The light-deprivation system of claim 11, wherein the pyramid has a polygonal base with at least four sides.

14. The light-deprivation system of claim 11, wherein the plurality of triangular shades each comprises a blackout material.

15. The light-deprivation system of claim 11, wherein the winch is motorized.

16. The light-deprivation system of claim 11, wherein the plurality of triangular shades are each gathered at the perimeter of the growing environment when the plurality of triangular shades are undrawn so as to be in an open configuration.

* * * * *